Dec. 29, 1959        R. A. MILLER        2,918,809
FLEXIBLE COUPLING FOR SHAFTS
Filed Feb. 26, 1959
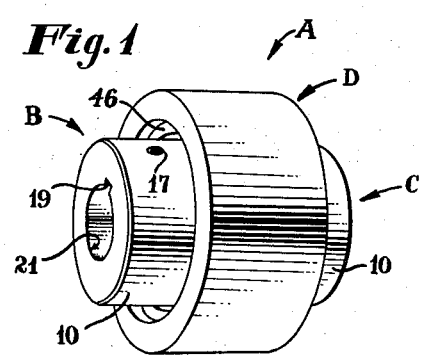
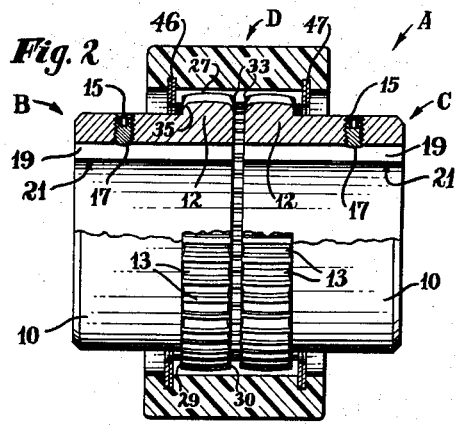
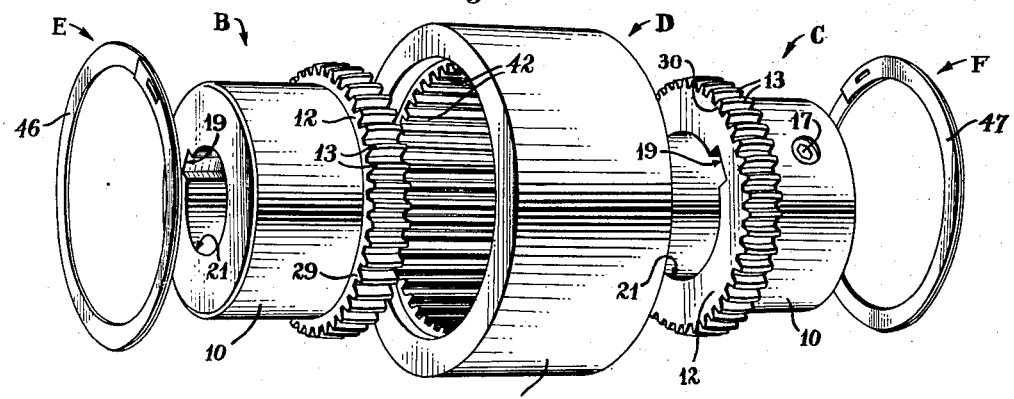
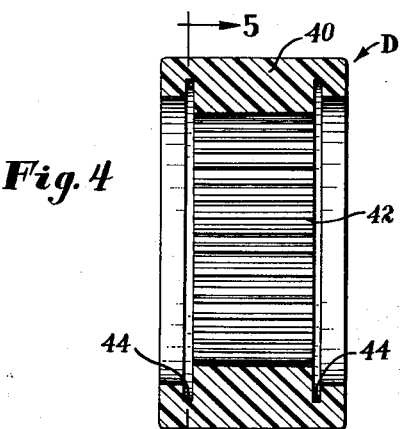
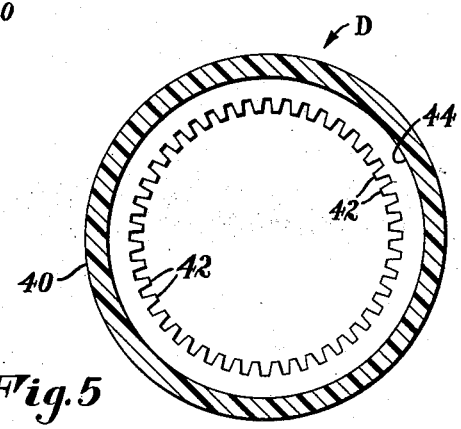
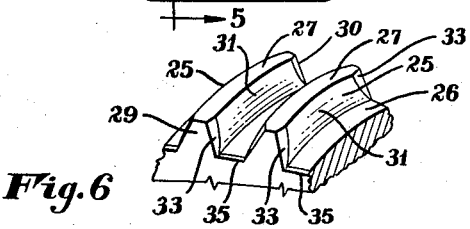
INVENTOR
Robert A. Miller
BY Rommel, Aleurie & Rommel
ATTORNEYS

United States Patent Office 2,918,809
Patented Dec. 29, 1959

2,918,809

FLEXIBLE COUPLING FOR SHAFTS

Robert A. Miller, Rutherford, N.J., assignor to Sier-Bath Gear and Pump Co., Inc., North Bergen, N.J., a corporation of New Jersey Application February 26, 1959, Serial No. 795,836

6 Claims. (Cl. 64—9)

This invention relates to flexible shaft couplings of the self aligning gear type.

The primary object of this invention is the provision of a coupling having a combination of parts of different materials and combining the most desirable attributes of a metal, such as steel, and a synthetic linear polyamide, such as nylon. In order to facilitate the understanding of the invention, the portion of the coupling composed of a synthetic linear polyamide will mainly be referred to as a nylon portion, as nylon has been found to be a synthetic linear polyamide particularly well adapted for such use. However, it is to be understood that any other suitable synthetic linear polyamide may be substituted for nylon.

In the past, flexible gear type couplings have been proposed constructed entirely of metal and entirely of a synthetic linear polyamide. The all metal couplings have been found to possess certain disadvantages, such as having excessive weight, requiring a lubricant, and requiring various seals and sealing rings in order to confine the lubricant in its desired location. These all metal couplings are likewise quite expensive, in view of the machining required, and are required to be of an extended length in order to provide a chamber for the lubrication and apertures for reception of the seals and sealing rings. The couplings moulded entirely of a synthetic linear polyamide have likewise been objectionable mainly because of the high co-efficient of friction of inter-engaging surfaces of the synthetic linear polyamide which required a separate capping, individual tooth moulding, etc. These all-synthetic linear polyamide couplings are also of an extended length and usually require some special construction in order to provide proper meshing of the gear teeth. Additionally, the continuous meshing of the all-synthetic linear polyamide teeth will cause undue wearing of the teeth and substantially limit the life of the coupling.

A further object is the provision of a flexible gear coupling having hubs of metal, such as steel, and a central sleeve of a synthetic linear polyamide, such as nylon, and including a pair of retaining rings for locking the hubs in position within the sleeve. In a coupling constructed according to my invention the intermeshing of the steel teeth of the hubs and the nylon teeth of the sleeve is virtually frictionless, due to the self lubricating properties of the nylon when in engagement with steel, and the coupling will have an exceptionally long period of life. This type of coupling will likewise endure a greater degree of angular and parallel mis-alignment and end float than will the standard gear couplings made of either all metal or all nylon, requires a minimum of maintenance, operates at temperatures up to 150° F., can be operated at speeds up to 5000 r.p.m., is lighter and smaller than any coupling in the same operating range, and requires no lubricants. Further, when the nylon sleeve becomes distorted, such as by excessive angular mis-alignment of the coupled shafts, the nylon sleeve will return to substantially its original configuration when the distorting force is removed.

A further object is the provision of a specially shaped gear tooth for the hubs of the coupling so that the nylon sleeve will not be gouged or damaged by the inter-engagement of the metal teeth therewith.

Other objects and advantages of this invention will be apparent during the course of the following detailed description, taken in connection with the accompanying drawing, forming a portion of this specification, and in which drawing:

Fig. 1 is a perspective view of my improved coupling.

Fig. 2 is an enlarged longitudinal sectional view of the coupling of Figure 1.

Fig. 3 is an exploded perspective view of my improved coupling.

Fig. 4 is an enlarged longitudinal sectional view of the nylon sleeve of my improved coupling.

Fig. 5 is a transverse sectional view taken substantially on the line 5—5 of Figure 4.

Fig. 6 is an enlarged fragmentary view of the improved teeth of the hubs.

In the drawing, wherein for the purpose of illustration is shown a preferred embodiment of the invention, and wherein similar reference characters designate corresponding parts throughout the several views, the letter A may generally designate my improved coupling, comprising three main elements—two similar complementary steel shaft hub members B and C, and a unitary nylon sleeve member D, with retaining rings E and F mounted adjacent the ends of the sleeve member D and cooperating with the shaft hub members B and C to maintain the coupling elements assembled.

Steel shaft hub members B and C each comprise a cylindrical collar 10 formed with an inner flange 12 having peripheral gear teeth 13. The cylindrical collar 10 is provided with a threaded bore 15 that receives a set screw 17 that projects into the key-way 19 formed in the cylindrical bore 21 of the collar 10. The collars 10 snugly inter-fit about and receive within the bore 21 the respective shaft ends (not shown) upon which the coupling is to be mounted. Keys (not shown) are inter-fitted within the cooperating key-ways of the shafts and the key-ways 19, and the set screws 17 screwed into abutment with the keys, retaining the hubs upon the shafts.

The teeth 13 of the hubs B and C are particularly designed to provide optimum cooperating contact with the nylon sleeve D, the teeth 13 being crown hobbed and having chamfered end edges in order to provide maximum surface contact during mis-alignment and to prevent gouging of the nylon sleeve. The teeth 13 are provided with addendum, pitch and dedendum portions 25, with valleys 26 therebetween. The uppermost surface 27 of each tooth, on the addendum circle, is of an arcuate configuration converging to the ends 29 and 30 of each tooth. The working face 31 of each of the teeth 13 is arcuately formed in a standard involute curve, so that the width of each tooth decreases from the dedendum circle to the addendum circle, and the ends 29 and 30 of each tooth are chamfered, as at 33, to each working face. The valleys 26 have an uppermost surface 28 of an arcuate configuration, being struck from the same center as the upper arcuate surface 27 of each tooth, and each of the ends 29 and 30 of the valleys are chamfered as at 35. The arcuate surfaces 27 and 28 of the hubs B and C are provided so that maximum contact with the sleeve D is maintained during positions of angular and parallel mis-alignment and end float. These surfaces 27 and 28 of the steel hubs B and C are likewise arcuately formed so that they will not gouge into the nylon sleeve D; the chamfered portions 33 and 26 being likewise provided so that the ends of the gear teeth 13 will not gouge the nylon sleeve D. In the usual all metal coupling, the provision of crown hobbed involute teeth upon the hubs, mating with a metal sleeve, will provide only point contact, however, with the use of the nylon sleeve and the metal teeth above described, the internal teeth of the nylon sleeve will substantially envelop the teeth of the hubs, providing substantially full tooth contact when the coupling is operated under load, and providing a minimum of backlash.

The cooperating sleeve member D is preferably of a moulded synthetic linear polyamide, such as nylon, comprising a cylindrical body portion 40 having a plurality of internal gear teeth 42 extending longitudinally a distance sufficient for engagement with the gear teeth 13 of both hubs B and C and for permitting angular displacement of the hubs. The sleeve is provided with grooves 44, at each end of the teeth 42, for receiving the retaining rings E and F for retaining the hubs B and C in juxtaposition within the sleeve D. This nylon sleeve D may be moulded in a single operation, with the gear teeth 42 being formed to cooperate with the gear teeth 13 of the hubs B and C. When a load is placed upon the coupling, the resiliency of the synthetic linear polyamide will permit the teeth 42 to virtually envelop the teeth 13, so that full teeth bearing is secured, and the "memory" of the nylon provides a sleeve member that can be considerably distorted (within its elastic limits) and which will resume substantially its original shape after the load causing the distortion is removed. This cooperation of the metal hubs and the nylon sleeves provides a flexible coupling that is substantially wear-resistant and will function properly even in advanced cases of mis-alignment. For instance, a flexible coupling constructed according to this invention was subject to 800 hours of continuous operation at substantially 5° mis-alignment, and there were discovered absolutely no signs of wear on the coupling, even though dirt, oil, water, and other abrasive materials were thrown into the coupling during its operation.

The retaining rings E and F comprise conventional spring steel split rings 46 and 47 that may be compressed and inter-fitted within the grooves 44 to each end of the sleeve D. These retaining rings are absolutely essential when conditions of end float are present and will withstand approximately 5000 pounds of end thrust when socketed within the nylon sleeve as shown.

Various changes in the shape, size and arrangement of parts may be made to the form of invention herein shown and described, without departing from the spirit of the invention or scope of the following claims.

I claim:

1. In a flexible shaft coupling of the self aligning gear type, the combination of a pair of complementary metal shaft hubs each having gear teeth provided at one end thereof, the working faces of said gear teeth being smooth surfaced, and a one piece cylindrical sleeve having internal gear teeth extending lengthwise over and in engagement with the gear teeth on both of said hubs, the working faces of opposite sides of the gear teeth of said hubs being convergent at the vertices of the working faces and ends thereof, spacing the vertices of the working faces and the ends of said gear teeth inwardly from the working faces of each of said gear teeth so that the vertices of the working faces and the ends of said gear teeth are substantially out of the plane of contact between the gear teeth of said hubs and the gear teeth of said one piece cylindrical sleeve, said one piece cylindrical sleeve being formed of a synthetic linear polyamide having self lubricating and wear resistant properties and being of a somewhat resilient material and of suitable strength to couple said hubs in a driving relationship, said gear teeth on said one piece cylindrical sleeve being of a pitch to mesh with the gear teeth on said hubs and resiliently engaging substantially the entire working face of the gear teeth of said hubs when under load, thereby avoiding only pitch circle contact between the meshing gear teeth.

2. In a flexible shaft coupling of the self aligning gear type, the combination of a pair of complementary metal shaft hubs each having gear teeth provided at one end thereof, the working faces of said gear teeth being smooth surfaced and chamfered at the vertices of the working faces and ends thereof to provide gear teeth having working faces with convergent end portions, and a one piece cylindrical sleeve having internal gear teeth extending lengthwise over and in engagement with the gear teeth on both of the hubs, said one piece cylindrical sleeve being formed of a synthetic linear polyamide having self lubricating and wear resistant properties and being of a somewhat resilient material and of suitable strength to couple said hubs in a driving relationship, said gear teeth on said one piece cylindrical sleeve being of a pitch to mesh with the gear teeth on said hubs and resiliently engaging substantially the entire working face of the gear teeth of said hubs when under load, thereby avoiding only pitch circle contact between the meshing gear teeth.

3. In a flexible shaft coupling of the self aligning gear type, the combination of a pair of complementary metal shaft hubs each having gear teeth provided at one end thereof, the working faces of said gear teeth being smooth surfaced and the vertices of the valleys and ends of the gear teeth of said hubs peripherally divergent from the dedendum circle thereof, and a one piece cylindrical sleeve having internal gear teeth extending lengthwise over and in engagement with the gear teeth on both of the hubs, said one piece cylindrical sleeve being formed of a synthetic linear polyamide having self lubricating and wear resistant properties and being of a somewhat resilient material and of suitable strength to couple said hubs in a driving relationship, said gear teeth on said one piece cylindrical sleeve being of a pitch to mesh with the gear teeth of said hubs and resiliently engaging substantially the entire working face of the gear teeth of said hubs when under load, thereby avoiding only pitch circle contact between the meshing gear teeth.

4. In a flexible shaft coupling of the self aligning gear type, the combination of a pair of complementary metal shaft hubs each having gear teeth provided at one end thereof, the working faces of said gear teeth being smooth surfaced, and a one piece cylindrical sleeve having internal gear teeth extending lengthwise over and in engagement with the gear teeth on both of the hubs, said one piece cylindrical sleeve being formed of a synthetic linear polyamide having self lubricating and wear resistant properties and being of a somewhat resilient material and of suitable strength to couple said hubs in a driving relationship, said one piece cylindrical sleeve being provided with retaining ring grooves of a greater diameter than the internal gear teeth thereof, said retaining ring grooves being provided immediately adjacent the ends of the internal gear teeth of said sleeve, a substantially transversely rigid retaining ring mounted in each of said grooves for holding the teeth of said hubs in continuous abutment with the teeth of said sleeve, said gear teeth on said one piece cylindrical sleeve being of a pitch to mesh with the gear teeth on said hubs and resiliently engaging substantially the entire working face of the gear teeth of said hubs when under load, thereby avoiding only pitch circle contact between the meshing gear teeth.

5. A flexible shaft coupling of the self aligning gear type including a pair of complementary steel shaft hub members each having gear teeth provided at one end thereof, a unitary cylindrical nylon sleeve member having internal gear teeth extending lengthwise over and in engagement with the gear teeth on both of the hubs, said sleeve member having grooves at each end thereof immediately adjacent the ends of the gear teeth thereof, and a substantially transversely rigid retaining ring mounted in each of said grooves, said retaining ring being adapted to abut the ends of the gear teeth of said hub when conditions of severe misalignment or end float exist and maintaining the teeth of said hubs in complete continuous engagement with the teeth of said sleeve under such conditions.

6. In a flexible shaft coupling of the self aligning gear type, the combination of a pair of complementary metal shaft hubs each having gear teeth provided at one end thereof, the working faces of said gear teeth being smooth surfaced, and a one piece cylindrical sleeve having internal gear teeth extending lengthwise over and in engagement with the gear teeth on both of the hubs, the working faces of opposite sides of the gear teeth of said hubs being convergent at the vertices of the working faces and ends thereof, spacing the vertices of the working faces and the ends of said gear teeth inwardly from the working faces of each of said gear teeth so that the vertices of the working faces and the ends of said gear teeth are substantially out of the plane of contact between the gear teeth of said hubs and the gear teeth of said one piece cylindrical sleeve, said one piece cylindrical sleeve being formed of a synthetic linear polyamide having self lubricating and wear resistant properties and being of a somewhat resilient material and of suitable strength to couple said hubs in a driving relationship, said one piece cylindrical sleeve being provided with retaining ring grooves of a greater diameter than the internal gear teeth therein, said retaining ring grooves being provided immediately adjacent the ends of the internal gear teeth of said sleeve, a substantially transversely rigid metal retaining ring mounted in each of said grooves for holding the teeth of said hubs in continuous abutment with the teeth of said sleeve, the working faces of said gear teeth of the hubs thereby being provided with substantially metal to synthetic linear polyamide contact and the ends of said gear teeth of said hubs being provided with metal to metal contact, with any gouging effect of the gear teeth of said hubs being exerted upon the point of said metal to metal contact rather than upon said metal to synthetic linear polyamide contact, said gear teeth on said one piece cylindrical sleeve being of a pitch to mesh with the gear teeth on said hubs and resiliently engaging substantially the entire working face of the gear teeth of said hubs when under load, thereby avoiding only pitch circle contact between the meshing gear teeth.

References Cited in the file of this patent

UNITED STATES PATENTS

| | | |
|---|---|---|
| 2,079,460 | Marty | May 4, 1937 |
| 2,510,414 | Philbrick | June 6, 1950 |
| 2,699,656 | Anderson et al. | Jan. 18, 1955 |
| 2,859,599 | Case | Nov. 11, 1958 |
| 2,867,102 | Williams | Jan. 6, 1959 |